(12) United States Patent
Peisa et al.

(10) Patent No.: US 8,369,854 B2
(45) Date of Patent: Feb. 5, 2013

(54) LINK LAYER CONTROL PROTOCOL IMPLEMENTATION

(75) Inventors: Janne Peisa, Espoo (FI); Michael Meyer, Aachen (DE); András Rácz, Budapest (HU); Mats Sågfors, Kyrkslätt (FI); Johan Torsner, Masaby (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 442 days.

(21) Appl. No.: 12/516,699

(22) PCT Filed: Dec. 19, 2007

(86) PCT No.: PCT/SE2007/051038
§ 371 (c)(1),
(2), (4) Date: May 28, 2009

(87) PCT Pub. No.: WO2008/076073
PCT Pub. Date: Jun. 26, 2008

(65) Prior Publication Data
US 2010/0216471 A1   Aug. 26, 2010

(30) Foreign Application Priority Data
Dec. 19, 2006   (SE) ...................................... 0602768

(51) Int. Cl.
*H04W 36/00* (2009.01)
(52) U.S. Cl. ............... 455/436; 455/439; 455/435.1; 455/450; 370/347; 370/331; 370/449
(58) Field of Classification Search .......... 455/436–439, 455/443–444, 456.5, 33.2, 561
See application file for complete search history.

(56) References Cited

U.S. PATENT DOCUMENTS

| 6,414,964 B1 * | 7/2002 | Holmquist et al. ........... 370/449 |
| 6,424,833 B1 * | 7/2002 | Iizuka et al. .................. 455/436 |
| 2001/0034233 A1 * | 10/2001 | Tiedemann et al. .......... 455/436 |

(Continued)

FOREIGN PATENT DOCUMENTS

| WO | 03087978 A2 | 10/2003 |
| WO | 2005055636 A1 | 6/2005 |

(Continued)

OTHER PUBLICATIONS

International Search Report for PCT/SE2007/051038 mailed May 8, 2008.

*Primary Examiner* — Marcos Batista
*Assistant Examiner* — Keith Fang
(74) *Attorney, Agent, or Firm* — Potomac Patent Group PLLC

(57) ABSTRACT

A radio base station suitable for performing a handover operation for a LTE-variant of a radio access network comprises a transceiver and a status report requester. The transceiver is configured to facilitate wireless transmission between the radio base station and a wireless terminal over an air interface, including transmission of a radio link bearer for the connection over a downlink from the radio base station to the wireless terminal. The status report requester is configured to determine, according to one or more pre-defined criteria, whether to request from the wireless terminal a status report for a radio bearer prior to the radio base station transferring user data for the connection to another radio base station in conjunction with a handover.

23 Claims, 11 Drawing Sheets

U.S. PATENT DOCUMENTS

| | | | |
|---|---|---|---|
| 2002/0009997 A1* | 1/2002 | Stuempert et al. | 455/439 |
| 2002/0068588 A1* | 6/2002 | Yoshida et al. | 455/461 |
| 2003/0016648 A1* | 1/2003 | Lindsay et al. | 370/347 |
| 2003/0108027 A1* | 6/2003 | Kim et al. | 370/345 |
| 2004/0192302 A1* | 9/2004 | Achour et al. | 455/435.1 |
| 2004/0224687 A1* | 11/2004 | Rajkotia | 455/435.1 |
| 2006/0073836 A1* | 4/2006 | Laroia et al. | 455/450 |
| 2006/0277298 A1 | 12/2006 | Kim et al. | |
| 2007/0060127 A1* | 3/2007 | Forsberg | 455/436 |
| 2010/0046374 A1* | 2/2010 | Ludwig et al. | 370/236 |
| 2010/0227614 A1* | 9/2010 | Chun et al. | 455/436 |
| 2010/0329214 A1* | 12/2010 | Chun et al. | 370/331 |

FOREIGN PATENT DOCUMENTS

| | | |
|---|---|---|
| WO | 2007095966 A1 | 8/2007 |
| WO | 2008035935 A1 | 3/2008 |

* cited by examiner

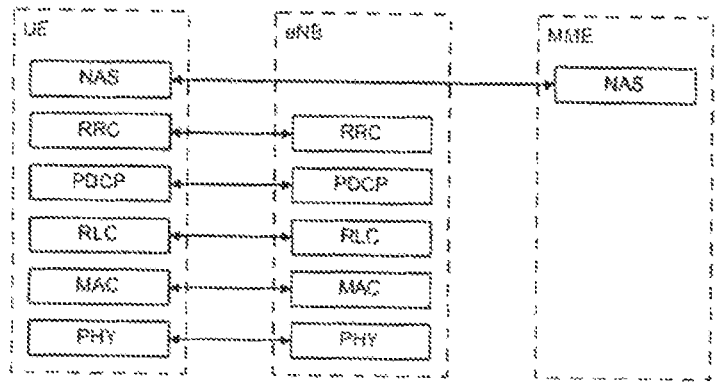
*Fig. 2*
(PRIOR ART)
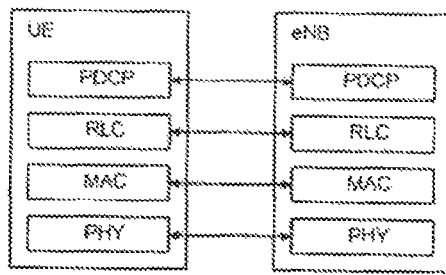
*Fig. 3*
(PRIOR ART)
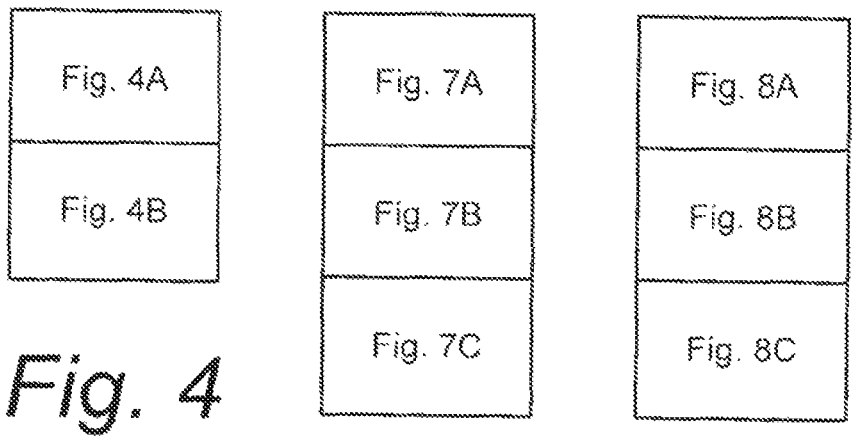
*Fig. 4*
(PRIOR ART)
*Fig. 7*
*Fig. 8*

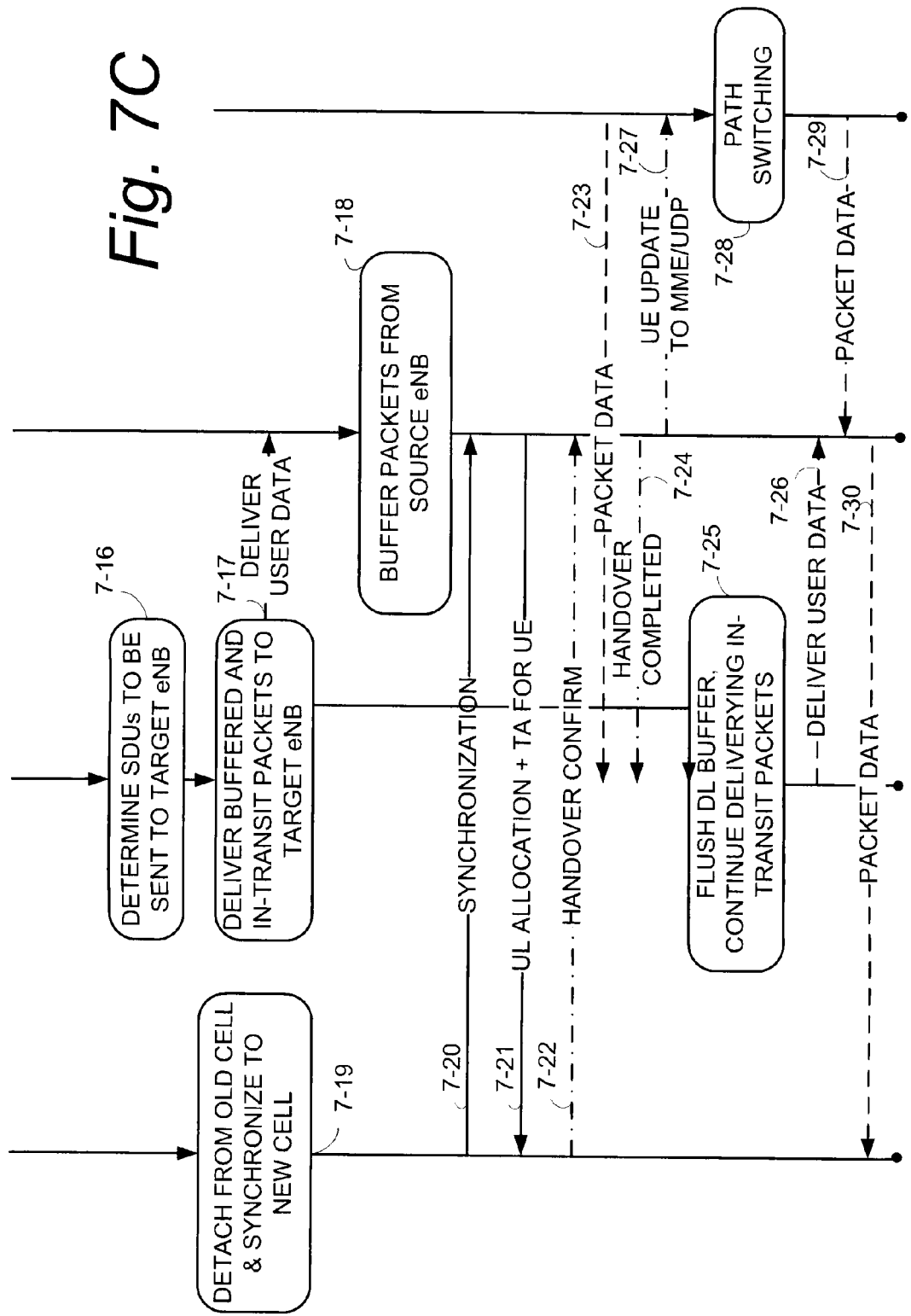

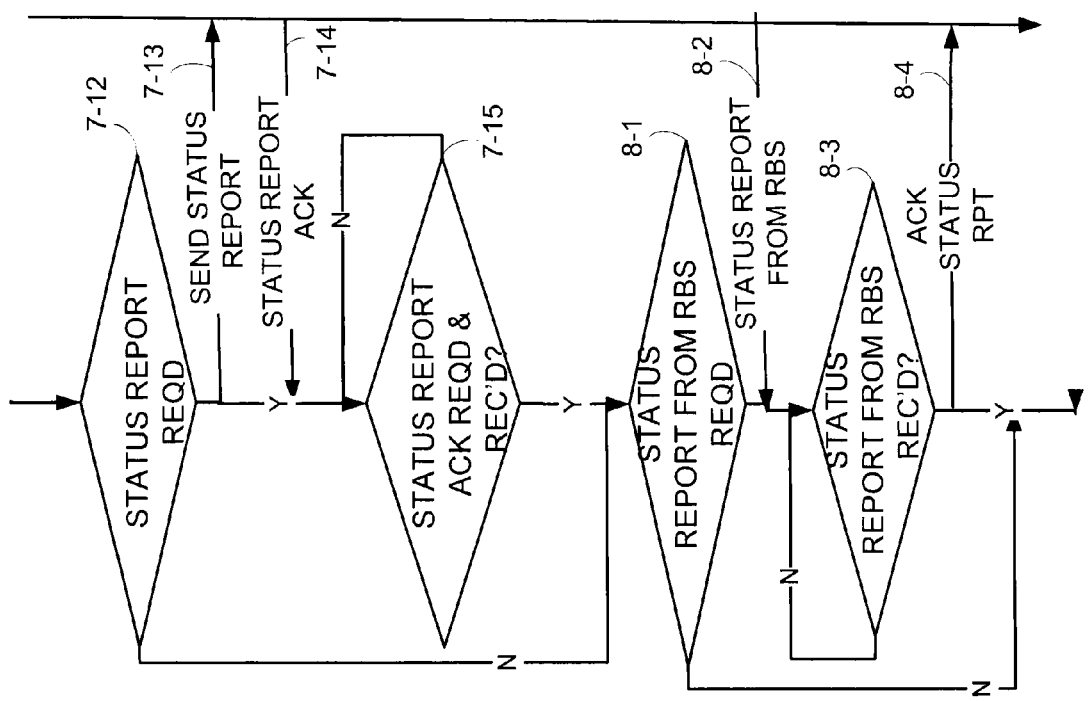

LINK LAYER CONTROL PROTOCOL IMPLEMENTATION

RELATED APPLICATIONS

This application claims priority and benefit from International Application No. PCT/SE2007/051038, filed Dec. 19, 2007, which claims priority to Swedish patent application No. 0602768-4, filed Dec. 19, 2006, the entire teachings of which are incorporated herein by reference.

FIELD OF THE INVENTION

The present invention relates to methods and arrangements for wireless telecommunications, and in particular to handover or transfer of data such as buffered data from a source base station to a target base station.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a unique identity within the local radio area, which is broadcast in the cell. The base stations communicate over the air interface (e.g., radio frequencies) with the user equipment units (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network providing wideband code division multiple access for user equipment units (UEs). The Third Generation Partnership Project (3GPP) has undertaken to evolve further the UTRAN and GSM based radio access network technologies.

In some WCDMA networks, as many as a few hundred radio base station nodes may be connected to an RNC. In WCDMA, a radio network controller (RNC) and its subservient radio base stations are collectively known as a Radio Network System (RNS). Similarly, in GSM the radio base stations (typically called "base transceiver stations" or "BTS" in GSM) are connect to a base station controller (BSC) node, with a BSC and its subservient base transceiver stations being collectively referred to as a Base Station Subsystem (BSS).

Evolved UTRAN (E-UTRAN), also referred to as Long Term Evolution (LTE), is a variant of a 3GPP radio access technology wherein the radio base station nodes are connected directly to a core network rather than to radio network controller (RNC) nodes. FIG. 1 shows high level architecture for Long Term Evolution (LTE).

As shown in FIG. 1, E-UTRAN employs a mobility management entity (MME) as a control node. The MME is responsible for idle mode UE tracking and paging procedure including retransmissions. The MME is involved in the bearer activation/deactivation process and is also responsible for choosing the serving gateway (SGW) for a user equipment unit (UE) at the initial attach and at time of intra-LTE handover involving Core Network (CN) node relocation. The MME is responsible for authenticating the user.

In general, in E-UTRAN the functions of a radio network controller (RNC) node are performed by the radio base stations nodes. As such, the radio access network (RAN) has an essentially "flat" architecture comprising radio base station nodes without reporting to radio network controller (RNC) nodes. The evolved UTRAN thus comprises evolved base station nodes, e.g., evolved NodeBs or eNBs, providing evolved UTRA user-plane and control-plane protocol terminations toward the user equipment unit (UE).

FIG. 2 shows the control plane stack for 3GPP LTE architecture; FIG. 3 shows the user plane stack for 3GPP LTE architecture. Non-Access Stratum (NAS) signaling terminates at the MME and it is also responsible for generation and allocation of temporary identities to UEs. In the control-plane, the NAS protocol, which runs between the MME and the UE, is used for control-purposes such as network attach, authentication, setting up of bearers, and mobility management. All NAS messages are ciphered and integrity protected by the MME and UE. The RRC layer in the eNB makes handover decisions based on neighbor cell measurements sent by the UE, pages for the UEs over the air, broadcasts system information, controls UE measurement reporting such as the periodicity of Channel Quality Information (CQI) reports and allocates cell-level temporary identifiers to active UEs. It also executes transfer of UE context from the source eNB to the target eNB during handover, and does integrity protection of RRC messages. The RRC layer is responsible for the setting up and maintenance of radio bearers. The radio link control (RLC) layer is the layer used to format and transport traffic between the eNodeB and the user equipment unit (UE).

The eNB hosts the following functions (among other functions not listed): (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility. The eNB hosts the physical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The eNBs are connected with each other by means of an X2 interface. The eNBs are also connected by means of an S1 interface to the Evolved Packet Core (EPC). The S1 interface supports a many-to-many relation between an access gateway (aGW) in the packet core and the eNBs. The S1 interface provides access to the Evolved RAN radio resources for the transport of user plane and control plane traffic. The S1 reference point enables MME and UPE separation and also deployments of a combined MME and UPE solution.

There are two levels of re-transmissions for providing reliability for LTE, namely, the Hybrid Automatic Repeat reQuest (HARQ) at the MAC layer and outer ARQ at the RLC layer. The outer ARQ is required to handle residual errors that are not corrected by HARQ that is kept simple by the use of a single bit error-feedback mechanism.

As in pre-LTE WCDMA networks, at some point it may be determined that a user equipment unit (UE) has relocated or moved so that it would now be better served by a new base station ("target" base station) rather than the base station which previously served the user equipment unit (the "source" base station). Such determination can be made, for example, upon comparison of signal strength measurements or the like received from the source base station and the target base station. Upon making such a determination, the user equipment unit (UE) participates with the radio access network in a "handover" process whereby traffic involving the user equipment unit (UE) is rerouted to the target base station.

A procedure for an intra-LTE hand-over is shown in FIG. 4. In order to avoid packet losses during hand-over, the procedure involves the transfer of buffered data from the source eNodeB to the target eNodeB. This transfer is started after step 4-4 (e.g., after the hand-over command).

It has been agreed in LTE that, in conjunction with the handover, a radio link control (RLC) protocol context will not be transferred, but rather the complete RLC SDUs that have not been received by the user equipment unit (UE) will be transmitted from the source to the target eNodeB.

In E-UTRAN, the target base station can be referred to as a "target eNodeB" and the source base station can be referred to as a "source eNodeB". In the handover procedure for LTE, knowing exactly which packets of the traffic stream destined to the user equipment unit (UE) need to be rerouted to the target eNodeB (those not already successfully received by the user equipment unit (UE)), and knowing when to perform the handover, can be problematic. Part of the problem resides in the fact that, while the eNodeB sends packets to the user equipment unit (UE), those packets are received by the eNodeB in the form of a larger unit as part of the radio link control (RLC) protocol, the larger unit typically being called a service data unit (SDU).

There are at least two possible ways to determine which Service Data Units (SDU) have been completely received by the user equipment (UE).

As a first way, the eNodeB (i.e., an LTE-base station) can use the HARQ information (ACK/NACK status) to determine which HARQ processes have been successfully received by the user equipment. This information can then be mapped to successfully received RLC protocol data units (PDUs) and finally to RLC SDUs. However, the problem with this solution is that the HARQ feedback signaling is not fully reliable, which can lead to residual packet losses during the hand-over.

As a second way, it is possible to use RLC status report(s) to obtain reliable information on which RLC PDUs have been successfully received in the user equipment. The RLC status report contains an indication of the received and not received RLC PDUs. This information can then be mapped to the undelivered RLC SDUs. This method avoids the problem of residual packet losses, but requires the transmission of the RLC status report from the user equipment to the radio base station (eNodeB). This consumes uplink resources and leads to a delay before the forwarding can start.

SUMMARY

Thus, if the HARQ information (ACK/NACK information) is used to determine which RLC SDUs should be forwarded from source to the target eNodeB during LTE handover, residual packet losses can occur during the hand-over. On the other hand, if the RLC status information (RLC status report) is used to determine which RLC SDUs should be forwarded from source to the target eNodeB during LTE hand-over, uplink resources are needed and the hand-over execution can be delayed.

What is needed, therefore, and an object of the present invention, is one or more of apparatus, methods, techniques, and/or systems for efficiently performing handover for a flat radio access network such as LTE.

One aspect of the technology pertains to a radio base station suitable for performing a handover operation for a LTE-variant of a radio access network. The radio base station comprises a transceiver and a status report requester. The transceiver is configured to facilitate wireless transmission between the radio base station and a wireless terminal over an air interface, including transmission of a radio link bearer for the connection over a downlink from the radio base station to the wireless terminal. The status report requester is configured to determine, according to one or more pre-defined criteria, whether to request from the wireless terminal a status report for a radio bearer prior to the radio base station transferring user data for the connection to another radio base station in conjunction with a handover.

In an example embodiment, the radio base station further comprises a handover controller configured to generate an indication to the wireless terminal to wait for a status report from the radio base station (e.g., a status report transmitted on the downlink from the radio base station to the wireless terminal) before executing the handover.

Another aspect of the technology pertains to a method of operating a first radio base station of a mobile telecommunication network, and particularly for performing a handover of a wireless terminal to a second radio base station including sending a handover command to the wireless terminal. The method comprises identifying a radio bearer with outstanding data to be transmitted and for which, according to one or more pre-defined criteria, a status report for the radio bearer is requested from the user equipment. The method further comprises requesting the status report for the identified radio bearer from the user equipment.

In an example mode, the method further comprises indicating to the wireless terminal to wait for a status report from the radio base station before executing the handover.

In one example embodiment and mode, the pre-defined criterion comprises tolerance for packet losses or quality of service class for the bearer.

In another example embodiment and mode, the pre-defined criterion depends upon whether a higher layer transmission should be successfully completed by awaiting outstanding data to be transmitted over the downlink.

In another example embodiment and mode, the pre-defined criterion is status of a potentially ongoing Non-Access Stratum (NAS) procedure.

In another example embodiment and mode, the status report requester is configured to implement the request by a polling mechanism per bearer.

In another example embodiment and mode, the status report requester is configured to implement the request by a single poll indicating plural bearers.

In another example embodiment and mode, the status report requester is configured to implement the request by a poll request included in the handover command.

Another example aspect of the technology concerns a wireless terminal suitable for operating in conjunction with the example methods and radio base station(s) herein described. The wireless terminal comprises a transceiver and a handover controller. The transceiver is configured to facilitate wireless transmission between the wireless terminal and one or more radio base stations over an air interface, including transmission of a radio link bearer for the connection over a downlink from a source radio base station to the wireless terminal. The handover controller is configured to ascertain whether, pursuant to a request from the source radio base station, a status report is to be sent to the source radio base station for a radio bearer involved in a connection with the source radio base station prior to performing a handover of the connection from the source radio base station to a target radio base station. The wireless terminal typically further comprises a status report generator configured to generate the status report.

Another example aspect of the technology concerns a method of operating a wireless terminal of a mobile telecommunication network when performing a handover from a first radio base station to a second radio base station. The method comprises receiving a handover command from the first radio base station and determining whether to send a status report to the radio base station for one or more radio bearers. If no status report has been requested, the method includes executing the handover. If a status report has been requested for one or more radio bearers, the method includes sending said status report to the radio base station and then executing the handover.

As an example optional act, the method can further comprise determining whether to wait for a status report from the radio base station before executing the handover.

As an example optional act, the method can further comprise waiting until a positive acknowledgement has been received from the radio base station for the status report before executing the handover.

Thus, principally the present technology involves methods and arrangements in both the radio base station (eNodeB) and the user equipment. The radio base station identifies for which bearers a RLC status report is required from the wireless terminal. This can then be indicated to the wireless terminal. The wireless terminal on the other hand bases the timing of the hand-over execution on the information received from the radio base station. If the radio base station does not require any status reports, the wireless terminal can perform the hand-over immediately. However, if the radio base station has requested one or more status reports, the wireless terminal waits until it has received an HARQ ACK for the status report, and then executes the hand-over.

The present invention allows faster hand-over execution for services that can tolerate packet losses, but provides also support for loss-less hand-over for bearers that require very low loss probability. It can also increase radio efficiency by limiting the number of unnecessary retransmissions on the radio interface and it can avoid potential extra delays as perceived by the user due to the retransmissions.

The present invention provides the advantage that it allows a faster hand-over execution for services that can tolerate packet losses, while at the same time also providing support for loss-less hand-over for bearers that require very low loss probability.

It is a further advantage of the present invention to increase the radio efficiency by limiting the number of unnecessary retransmissions on the radio interface and avoiding potential extra delays as perceived by the user due to the retransmissions.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a diagrammatic view of the control plane stack for 3GPP LTE architecture.

FIG. 3 is a diagrammatic view of the use plane stack for 3GPP LTE architecture.

FIG. 7 is a block diagram showing relationship of FIG. 7A to FIG. 7C.

FIG. 7A, FIG. 7B, and FIG. 7C are flowcharts illustrating basic example acts or steps comprising an intra-LTE handover according to an example mode.

FIG. 8 is a block diagram showing relationship of FIG. 8A to FIG. 8C.

FIG. 8A, FIG. 8B, and FIG. 8C are flowcharts illustrating basic example acts or steps comprising an intra-LTE handover according to an example mode.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
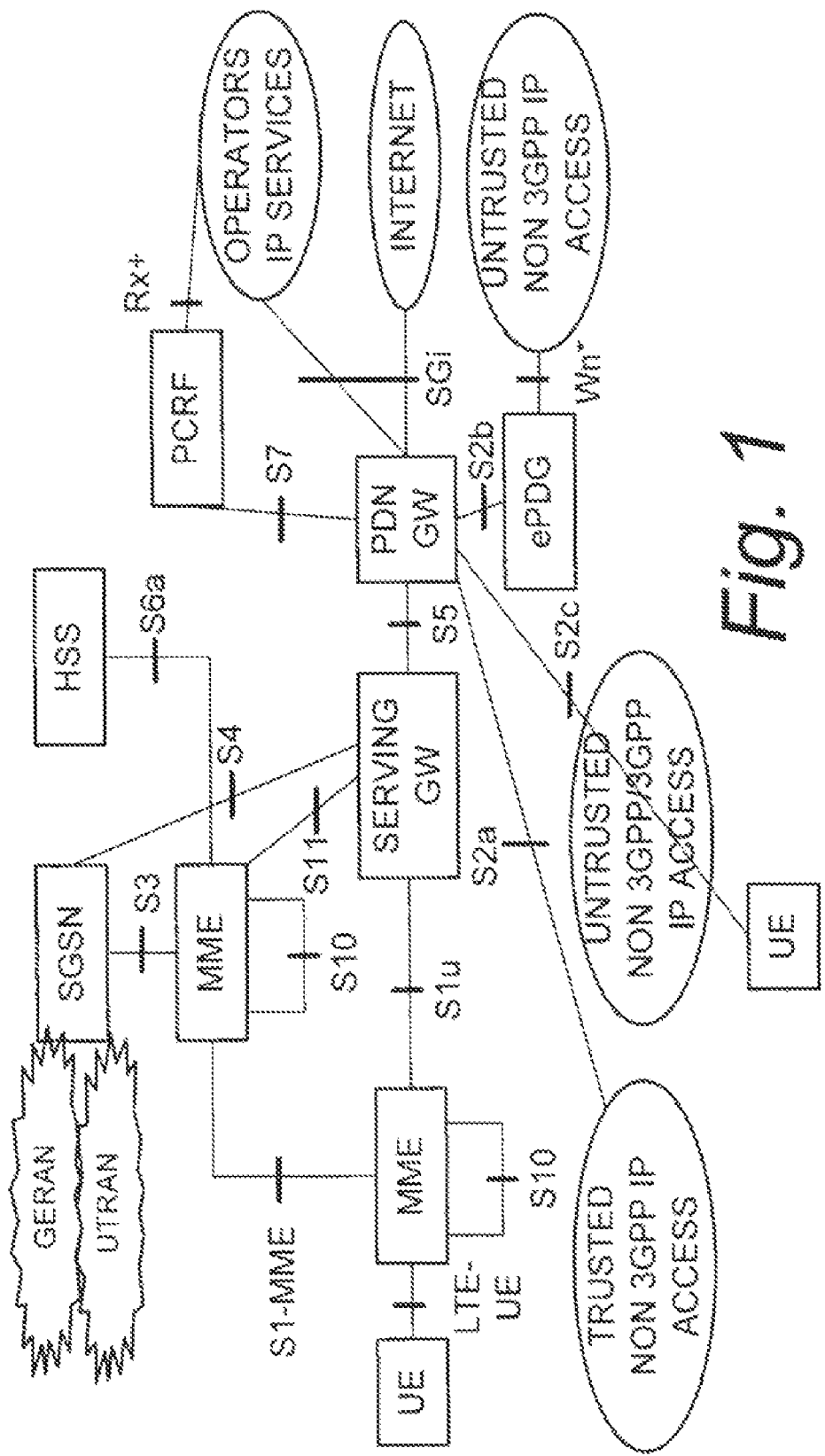
FIG. 1 is a diagrammatic view of higher level architecture for an LTE variant of a 3GPP radio access technology network.
Figure 5:
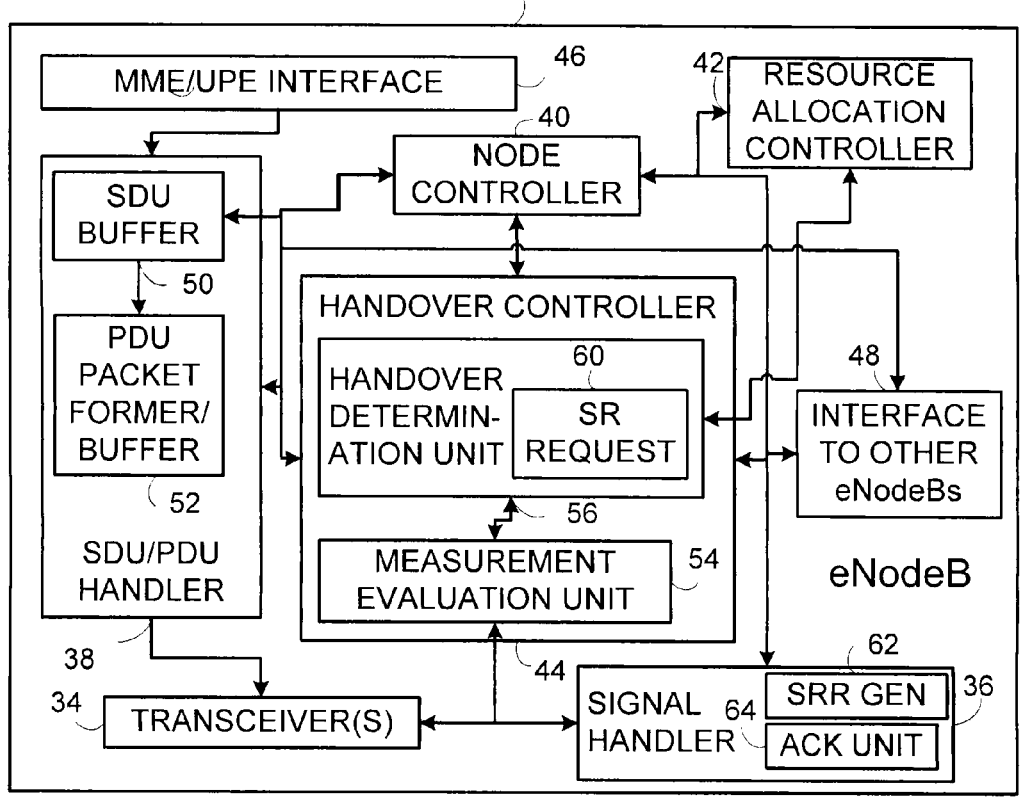
FIG. 5 is a diagrammatic view of example components of a radio base station (eNodeB) according to an example embodiment.

For the E-UTRAN architecture such as that generally depicted by FIG. 1 includes a radio base station often termed the "eNodeB". FIG. 5 illustrates example components of such a radio base station (eNodeB), e.g., eNodeB 28, according to an example embodiment which is compatible with the present technology. The eNodeB 28 communicates with a wireless terminal 30 (see FIG. 6) over an air interface. The eNodeB 28 comprises transceiver(s) 34; signal handler 36; SDU/PDU handler 38; one or more controllers; and one or more interfaces. The controller(s) of eNodeB 28 can include the functionalities of node controller 40; resource allocation controller 42; and, handover controller 44. In an example embodiment the interfaces of eNodeB 28 includes MME/UPE interface 46 and an interface 48 to other eNodeBs. The interface 48 to other eNodeBs can provide compatibility to/for an X2 interface, for example.

In a downlink direction, service data units from a mobility management entity (MME)/user plane entity (UPE) such as that illustrated in FIG. 1 are received by eNodeB through MME/UPE interface 46 and applied to SDU/PDU handler 38. In particular, the service data units received from the MME/UDP are stored in an SDU buffer 50 of SDU/PDU handler 38, and are subsequently applied to PDU packet former/buffer 52 for formation of PDUs. Under timing coordination and control of node controller 40 the PDUs involved in a connection are discharged from SDU/PDU handler 38 and transmitted using a radio link bearer on a downlink over the air interface. In this regard, transceiver(s) 34 are configured to facilitate wireless transmission between eNodeB 28 and wireless terminal 30 over the air interface, including transmission of the radio link bearer. The particular radio link bearer which is to be utilized for the connection is chosen or determined by resource allocation controller 42.

While SDU/PDU handler 38 has above been described with reference to the downlink direction, it will be appreciated that SDU/PDU handler 38 or other comparable entity can also comprise elements suitable for handling PDUs received on the uplink from a wireless terminal, such as unillustrated elements such as a PDU deformatter/buffer and unit for forming service data units from the PDUs and storing the same prior to application to the MME/UPE through MME/UPE interface 46.

For sake of explanation, the three functionalities of node controller 40, resource allocation controller 42, and handover controller 44 are illustrated as separate controllers. However, it will be appreciated that these and other functionalities can be realized by one or more controllers or processors as those terms are expansively explained herein. As such, these functionalities can be implemented using single, shared, or distributed processors or controllers for example.

The handover controller 44 is shown in FIG. 5 as including both measurement evaluation unit 54 and handover determination unit 56. The measurement evaluation unit 54 is configured to receive and process measurements from a wireless terminal relating to relative strengths of signals (e.g., pilot signals or the like) received from plural radio base stations. The handover determination unit 56 makes a determination, based on the measurements processed by measurement evaluation unit 54, that a handover of the connection should occur. The handover of the connection is from a source radio base station to a target radio base station.

In an example embodiment, handover controller 44 also includes status report requester 60. For sake of convenience, in the example embodiment status report requester 60 is illustrated as comprising handover determination unit 56, although it may be realized elsewhere. As described herein, status report requester 60 is configured to determine, according to one or more pre-defined criteria, whether to request (from a wireless terminal) a status report (SR) for a radio bearer prior to a radio base station (such as eNodeB 28) transferring user data for the connection to another radio base station in conjunction with a handover.

It will be appreciated that, in accordance with 3GPP Technical Specification 25.322 for UTRAN and 3GPP Technical Specification 36.322 for E-UTRAN, for example, that wireless terminal 30 is capable of issuing a status report such as a RLC status report. The status report comprises an indication of which RLC PDUs were received and/or which RLC PDUs were not received. Unless other wise clear from the context, "status report" as used herein generally refers to a status report carried on the uplink from the wireless terminal to the radio base station or eNodeB. At some points it will be clear from the context that the wireless terminal may on some occasions await a status report on the downlink from the radio base station before performing handover.

FIG. 5 also shows eNodeB 28 as comprising status report generator 62. In the example embodiment of FIG. 5, status report generator 62 is illustrated as comprising signal handler 36. Signal handler 36 can also include other functionalities, such as acknowledgement unit (ACK unit) 64, for example.

Alternatively, status report generator 62 and ACK unit 64 can comprise or be included in other elements of eNodeB 28. For example, status report generator 62 can be included in handover controller 44, and ACK unit 64 can be included in node controller 40 or elsewhere.

As further explained herein, in an example variation, node controller 40 or other suitable constituent element of eNodeB 28 is configured to generate an indication to the wireless terminal to wait for a status report from the radio base station before executing the handover.

Figure 6:
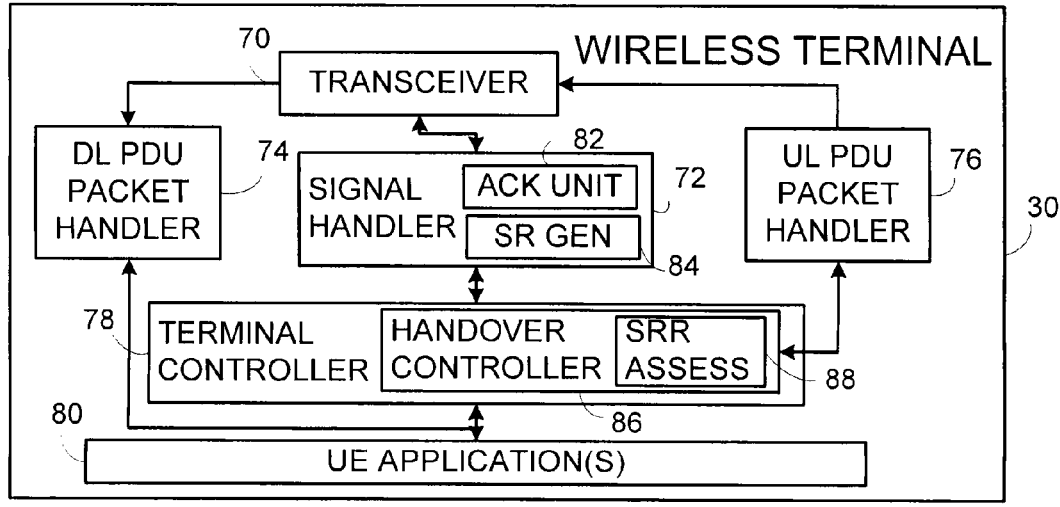
FIG. 6 is a diagrammatic view of example components of a wireless terminal according to an example embodiment.

FIG. 6 illustrates example components of a wireless terminal, e.g., wireless terminal 30, according to an example embodiment which is compatible with the present technology. The wireless terminal 30 of FIG. 6 comprises transceiver 70; signal handler 72; downlink (DL) packet handler 74; uplink (UL) packet handler 76; terminal controller 78; and terminal application(s) 80. In an example embodiment, signal handler 72 comprises acknowledgement unit 82 and status report generator 84. Status report generator 84 is configured to generate the status report for transmission by transceiver 70 over the air interface to a radio base station such as eNodeB 28.

Downlink PDUs received from eNodeB 28 over the air interface by transceiver 70 of wireless terminal 30 are applied to downlink (DL) packet handler 74 and are processed for sending to terminal application(s) 80. The PDUs can be involved, for example, in a service which involves execution of one or more of terminal application(s) 80. Similarly, PDUs generated by one or more terminal application(s) 80 for transmission on the uplink are applied to uplink (UL) packet handler 76 prior to transmission by transceiver 70 over the air interface to eNodeB 28. Both downlink signaling received from eNodeB 28 and uplink signaling from wireless terminal 30 destined to eNodeB 28 are prepared/processed by signal handler 72. Although separately illustrated for ease of understanding, one or more of the functionalities of signal handler 72, downlink (DL) packet handler 74, and uplink (UL) packet handler 76 can be included in or realized by a controller or processor, as those terms are expansively explained herein. Such functionalities can be realized by single, shared, or distributed processors or controllers, or even included in terminal controller 78, for example.

The terminal controller 78 comprises handover controller 86. Handover controller 78 is configured to ascertain whether, pursuant to a request from a source radio base station such as eNodeB 28, a status report (SR) is to be sent to the source radio base station for a radio bearer involved in a connection with the source radio base station prior to performing a handover of the connection from the source radio base station to a target radio base station. In this regard, terminal controller 78 is shown as comprising status report assessor 88.

Figure 4A:
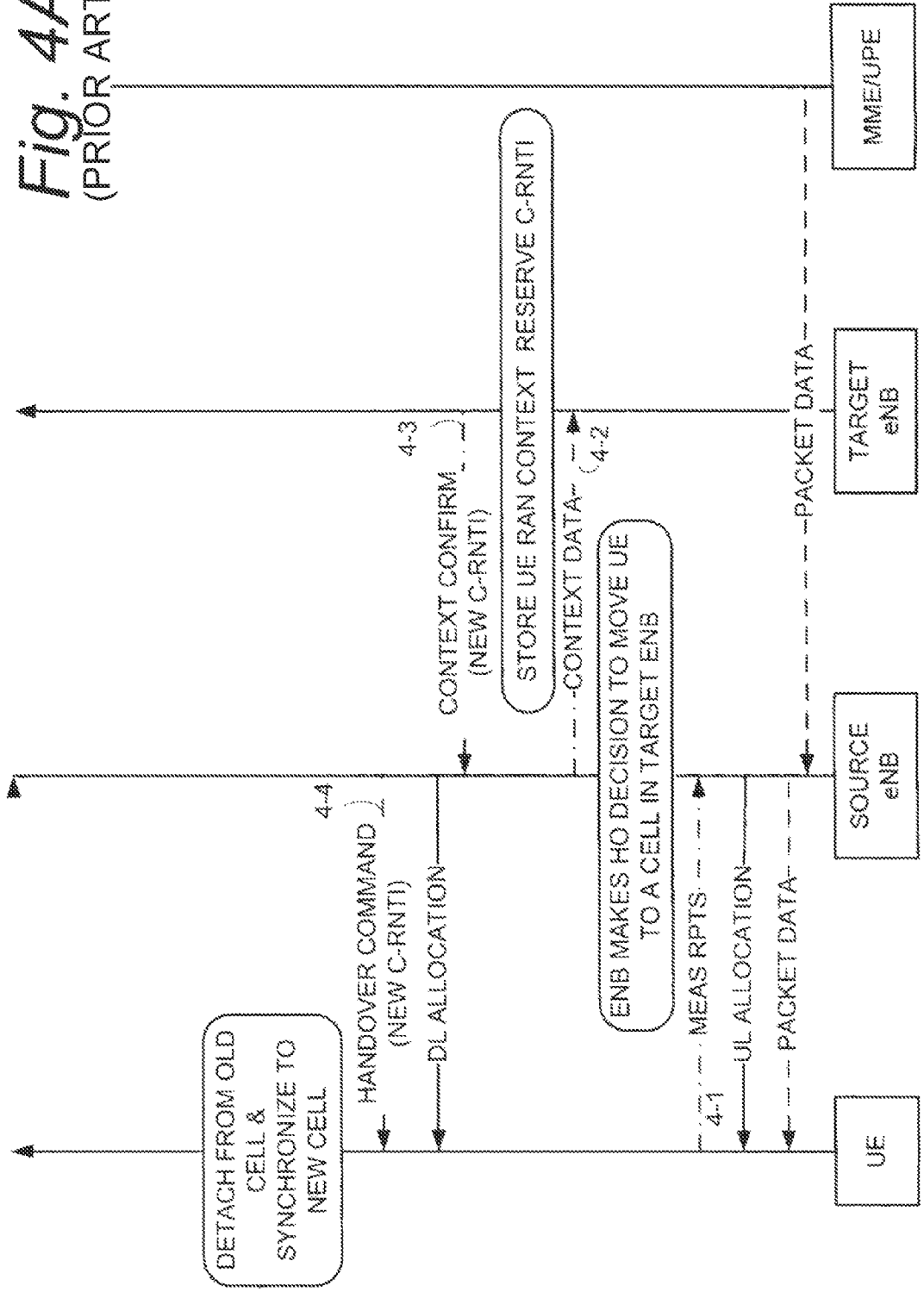
FIG. 4 is a block diagram showing relationship of FIG. 4A to FIG. 4B.
Figure 4B:
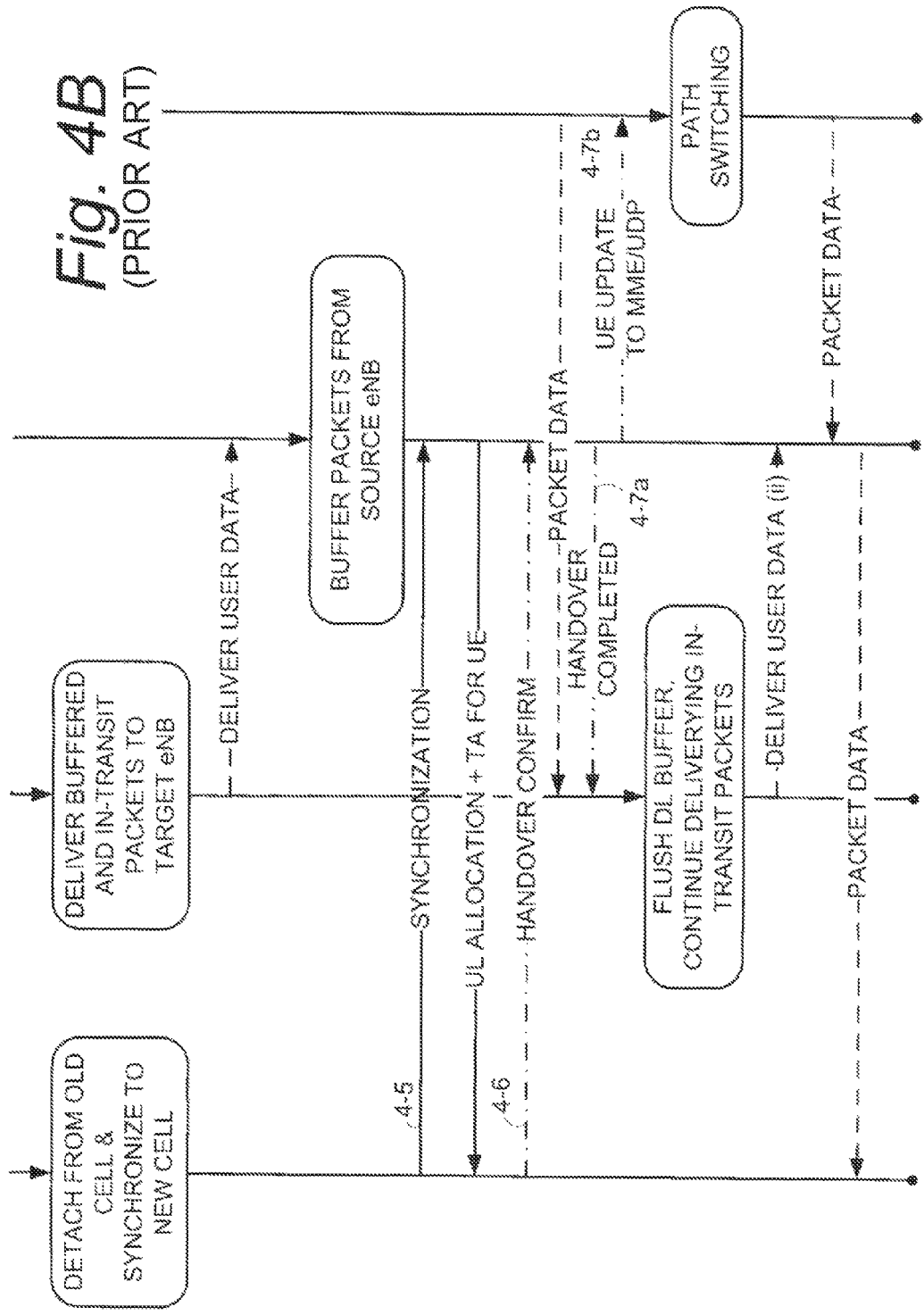
Figure 7A:
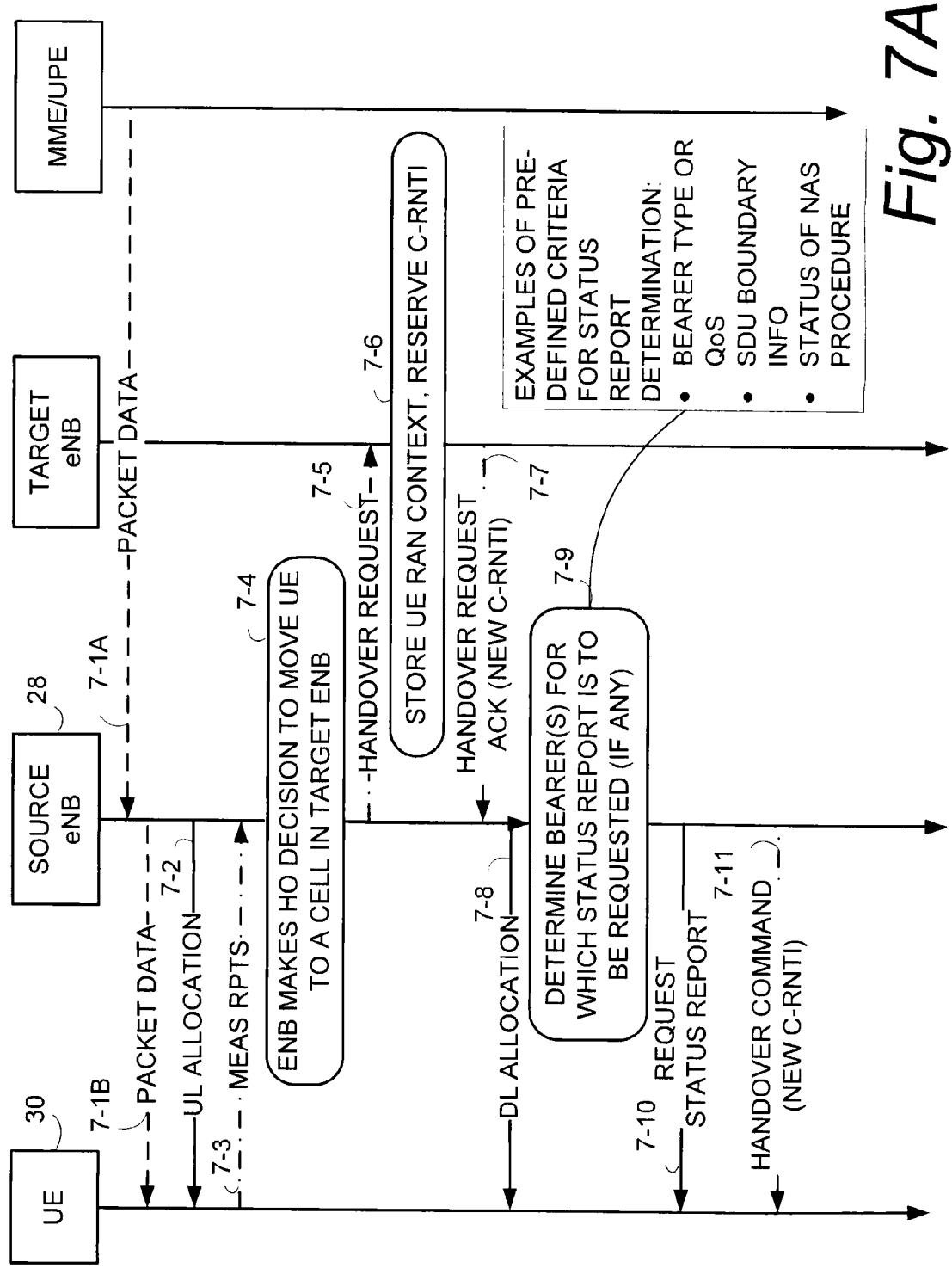
Figure 7B:
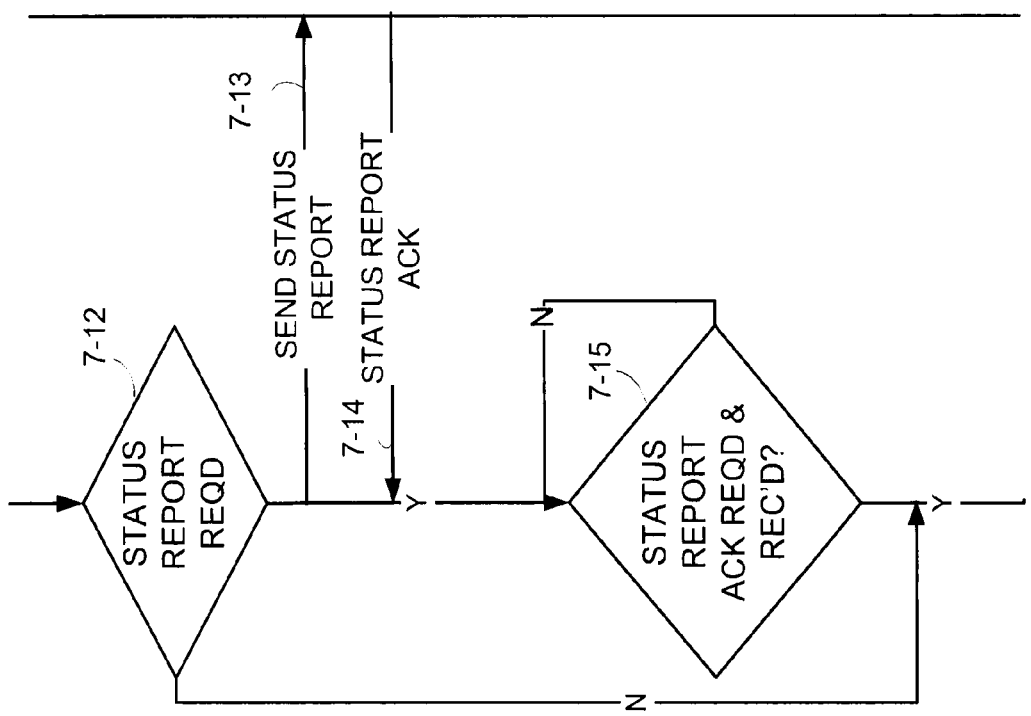

FIG. 7A and FIG. 7B illustrate basic example acts or steps comprising an intra-LTE handover according to an example mode of operation. In conjunction with the acts of FIG. 7A-FIG. 7B, as well as those of FIG. 4A and FIG. 4B, user data transmission is indicated by a dashed line; layer 3 (L3) signaling is represented by a dotted-dashed line; and L1/L2 signaling is represented by an unbroken line.

The handover operation depicted by FIG. 7A and FIG. 7B occurs in conjunction with an on-going connection involving wireless terminal 30 in which eNodeB 28 serves as a source radio base station. During the connection packet data in the form of SDUs are transmitted from MME/UPE to eNodeB 28 as depicted by act 7-1A. The SDU/PDU handler 38 of eNodeB 28 forms protocol data units (PDUs) from the SDUs received from MME/UPE. As act 7-1B, the PDUs are transmitted by transceiver(s) 34 of eNodeB 28 to wireless terminal 30. The transmission of PDUs occurring as act 7-1B occurs over one or more radio link bearer(s) involved in the connection, which preferably are chosen or allocated by resource allocation controller 42.

Act 7-2 shows eNodeB 28 as communicating to wireless terminal 30, over the air interface, an allocation of resources for uplink transmission to eNodeB 28. The uplink allocation of act 7-2 can be for various purposes, such as for measurement reports, for example.

Act 7-3 illustrates wireless terminal 30 transmitting a measurement report to eNodeB 28. As is understood by the person skilled in the art, such a measurement report typically comprises measurements of signal strength or other indicator of signal useability for various signal(s) or channel(s) (e.g., pilot channels) of plural radio base stations for which user interface 32 has been assigned to perform measurements. In the illustrated example embodiment of FIG. 5, the measurement report of act 7-3 is processed by measurement evaluation unit 54 of eNodeB 28.

As act 7-4 the handover determination unit 56 of eNodeB 28 makes a handover decision, e.g., a decision whether or not to move the wireless terminal involved in the connection from the cell handled by eNodeB 28 to another cell, e.g., a cell handled by another radio base station which will serve as a target radio base station in the handover. The handover determination decision depicted by act 7-4 is typically based on the measurements included in the measurement report received as act 7-3.

Once an affirmative decision to perform handover to another radio base station has been made, as indicated by act 7-5 the source eNode B issues a HANDOVER REQUEST message to the target eNode B passing necessary information to prepare the HO at the target side. The HANDOVER REQUEST message of act 7-5 includes certain data known as "context data" for the connection which is send from eNodeB 28 (which has been serving as the source radio base station) to the target radio base station, e.g., to the target eNodeB. The information included in the HANDOVER REQUEST message of act 7-5 includes UE X2 signalling context reference at source eNode B, UE S1 EPC signalling context reference, target cell ID, RRC context including the C-RNTI of the UE in the source eNode B, AS-configuration (excluding physical layer configuration), EPC bearer context and physical layer ID of the source cell+MAC for possible RLF recovery). UE X2/UE S1 signalling references enable the target eNode B to address the source eNode B and the EPC. The EPC bearer context includes necessary RNL and TNL addressing information, and QoS profiles of the EPC bearers.

The target eNode B prepares the handover with L1/L2 and sends the HANDOVER REQUEST ACKNOWLEDGE to the source eNode B. As act 7-6, the target eNodeB performs certain actions, such as (for example) storing the radio access network context data, and reserving an identifier for the wireless terminal 30 to use in the target cell (e.g., a C-RNTI). Thereafter, as depicted by act 7-7, the target eNodeB sends a HANDOVER REQUEST ACKNOWLEDGE message to eNodeB 28. The HANDOVER REQUEST ACKNOWLEDGE message of act 7-7 includes a context confirmation indication, as well as the C-RNTI identifier. The HANDOVER REQUEST ACKNOWLEDGE message includes a transparent container to be sent to the UE as part of the Handover Command. The container includes the new C-RNTI, optionally a dedicated RACH preamble, indication of the expiry time of the dedicated RACH preamble and possibly some other parameters i.e. access parameters, SIBs, etc. The HANDOVER REQUEST ACKNOWLEDGE message may also include RNL/TNL information for the forwarding tunnels, if necessary.

Further information regarding the HANDOVER REQUEST message of act 7-5 an the HANDOVER REQUEST ACKNOWLEDGE message of act 7-7 can be found in 3GPP Technical Specification 36.423 and 3GPP Technical Specification 36.413.

Act 7-8 includes eNodeB 28 providing a message with a downlink allocation to wireless terminal 30. The downlink allocation of act 7-8 can be for various purposes, such as for allocating resources for the ensuing request status report below described with reference to act 7-10.

As act 7-9, status report requester 60 determines, according to one or more pre-defined criteria, whether to request (from the wireless terminal) an RLC status report (SR) for a radio bearer prior to eNodeB 28 transferring user data for the connection to the target radio base station in conjunction with the handover. FIG. 7A further illustrates examples of the pre-defined criteria for the status report request determination of act 7-9, which criteria examples can either be individual or combined. Each example individual or combination of criteria can constitute a separate implementation or mode.

One or more radio bearers may be involved in a connection. For example, in a case in which the user has a VoIP call and also an Internet connection (web browsing) the user is employing two bearers. Alternatively or additionally, a user can have one corporate Internet connection and one public internet connection at the same time, which also requires two bearers. The eNodeB 28 has information about the required quality of service class for each bearer involved in the connection. For example, status report requester 60 can ascertain this information from resource allocation controller 42. Thus, in one example implementation and mode, and based on this resource-indicative information, eNodeB 28 can determine if the bearer(s) can tolerate residual packet losses during handover. Examples of such bearer types include best effort and interactive bearers. In this example mode and implementation, when sending a handover command to a wireless terminal, eNodeB 28 checks all, or at least a relevant selection, of the bearers that do not tolerate packet losses and checks if they have outstanding data. If such bearers exist, eNodeB 28 requests status reports (e.g. status reports (SR)) for those bearers only from the wireless terminal. Thus, in this example embodiment and mode, the pre-defined criterion comprises tolerance for packet losses or quality of service class for the bearer.

The requesting of the status reports can be done, e.g., with normal polling mechanism per bearer, with a single poll indicating several bearers, by including a poll request to the actual hand-over command, or any other appropriate means (see, e.g., 3GPP Technical Specification 26.322 which describes a "normal polling per bearer"). A further option is to include the poll in the handover command.

In other example embodiments and modes, the source eNodeB can use further information in addition to, or alternatively instead of, the QoS attribute of the bearer to determine whether or not to request a status report or not.

For example, another example embodiment and mode, if the source eNodeB anticipates that a higher layer SDU transmission can be finished successfully by awaiting the status report, then status report requester 60 requests such a report. In another example, if all the fragments of an SDU have been received (and acknowledged) except the one that is in the HARQ pipe at that moment, then it could be worth to wait for the feedback, because there is a good probably that the SDU can be completed successfully. In such a case status report requester 60 of eNodeB 28 can request a status report, especially if the bearer is of lossless nature. On the other hand, if there are untransmitted fragments of the SDU (e.g., fragments still waiting to be sent in a next HARQ process) then it is not worth requesting feedback, since the transmission of that SDU cannot be completed anyway. In such a case there might be no reason to request feedback even for lossless bearers. Instead the concerned SDU will be forwarded to the target eNodeB and sent out for a second time. Thus, in this example embodiment and mode, the pre-defined criterion depends upon whether a higher layer transmission should be successfully completed by awaiting outstanding data to be transmitted over the downlink. Information useful for status report requester 60 making the determination of act 7-9 in this embodiment and mode can be obtained from SDU/PDU handler 38 (e.g., SDU information) and ACK unit 64 (e.g., acknowledgement feedback from wireless terminal 30).

The eNodeB 28 may use, possibly in combination with knowledge about the SDU borders as described above, yet other information to decide whether to request a status report could be the status of potentially ongoing NAS procedure. For example, since the NAS messages will be often piggy-backed on RRC messages via eNodeB 28, eNodeB 28 will likely have knowledge about the ongoing NAS procedures and the current phase of the given procedure. For example, if the NAS procedure is in its final phase, meaning that the current SDU under transmission carries the last completion message of the NAS procedure, there is a good chance that the NAS procedure can be completed before the handover. In such a case the status report requester 60 of eNodeB 28 can decide on requesting a last status report. In other cases where the UE and the network are in the middle of a NAS procedure at the time when the handover occurs then there might be no motivation to try to finish the transmission of the current NAS message, since the whole procedure cannot be finished anyway and may need to be restarted from scratch at the target cell. Thus, in this further example embodiment and mode, the pre-defined criterion is status of a potentially ongoing Non-Access Stratum (NAS) procedure.

If the status report requester 60 makes a determination that a status report from the wireless terminal is desired, as act 7-10 the eNodeB 28 sends the request for the status report to wireless terminal 30. In particular, status report requester 60 authorizes or commissions status report generator 62 to generate the status report, which is transmitted by transceiver(s) 34 over the air interface to wireless terminal 30. The status report requested can be indicated by or expressed in various ways. For example, in one non-limiting example embodiment and mode, the status report requester 60 implements the request in the form of a polling mechanism per bearer. In another example embodiment and mode, the status report requester 60 implements the request in the form of a single poll indicating plural bearers. In yet another example embodiment and mode, the status report requester 60 implements the request in the form of a poll request included in the handover command itself.

Act 7-11 represents transmission from eNodeB 28 to wireless terminal 30 of the actual handover command. The handover command of act 7-11 includes the new C-RNTI which was afforded by the target eNodeB to wireless terminal 30 as part of act 7-6.

Upon receiving the handover command of act 7-11, as act 7-12 the wireless terminal 30 determines if it should send a status report (or wait for a status report) before executing the handover. In particular, status report assessor 88 of handover controller 86 can ascertain whether, pursuant to a request from the source radio base station, a status report is to be sent to the source radio base station for a radio bearer involved in a connection with the source radio base station prior to performing a handover of the connection from the source radio base station to a target radio base station. The assessment of act 7-12 can be performed by noting a polling requirement or other indicia which, by predetermined arrangement, prompts or requires the sending of the status report. In other words, depending on how the status report is requested, the detection or assessment of act 7-12 can be done either by reading the instruction from the handover command, or by checking if there are any RLC PDUs with poll bit set in the same TTI as the hand-over command. Other means are also possible for checking whether the RLC status report should be sent, e.g. by having a (positive or negative with respect to the handover command) window during which any RLC poll can be received.

If there are one or more status requests from the eNodeB, e.g., when such requirement is noted at act 7-12, the status report generator 84 of wireless terminal 30 generates a status report. As act 7-13 the transceiver 70 of wireless terminal 30 sends the status report over the air interface to eNodeB 28.

Upon receiving the status report of act 7-13, the handover controller 44 of eNodeB 28 also commissions ACK unit 64 to send as act 7-14 a HARQ acknowledgement message to wireless terminal 30 with respect to the status report. As an optional act 7-15, the handover controller 86 of wireless terminal 30 can require that the acknowledgement of the status report (such as that indicated by act 7-14) be received prior to the handover controller 86 executing the handover.

With the benefit of the information included in the status report received as act 7-13, as act 7-16 the handover controller 44 of eNodeB 28 determines which service data units (SDUs) are to be sent to the target eNodeB. The determination of act 7-16 is necessary for ascertaining which SDUs already in SDU buffer 50 of SDU/PDU handler 38 should be sent to the target eNodeB for transmission from target eNodeB to wireless terminal 30 after the handover is executed. Act 7-17 illustrates eNodeB 28 sending to the target eNodeB those SDUs (buffered and in-transit SDUs, as appropriate) destined by act 7-16 for transfer to the target eNodeB. Some of the SDUs sent to the target eNodeB as part of act 7-16 can be those from which PDUs have already been formed and sent by eNodeB 28 to wireless terminal 30, but for which positive feedback of reception of one or more such PDUs by wireless terminal 30 has not been received. The SDUs received by the target eNodeB from the source eNodeB are buffered at the target eNodeB, as indicated by act 7-18.

Act 17-19 depicts the handover controller 86 of wireless terminal 30 commencing execution of the handover command. The handover execution of act 7-19 can be reached if were determined at act 7-12 that generation of the status report was required, and if the status report has been generated, sent, and acknowledged (as reflected by act 7-13 through act 7-15). Alternatively, the handover execution of act 7-19 can be reached essentially immediately if were determined at act 7-12 that generation of the status report was not required. In other words, if there are no status report requests, or requests for awaiting a status report from the source eNodeB, the wireless terminal can execute the handover command immediately (or, if the handover command contains an execution time at which to begin the handover execution, at that point of time) without need to transmit an RLC status report to the eNodeB.

Act 7-19 comprises the wireless terminal 30 detaching from the old cell, e.g., from the cell of the source eNodeB, and synchronizing to the new cell, e.g., to the cell of the target eNodeB. In conjunction with performance of the handover operation, act 7-20 shows handover controller 86 of wireless terminal 30 sending a synchronization message to the target eNodeB. In response, as act 7-21 the target eNodeB responds with an uplink allocation and timing advance for use by the wireless terminal 30 for the connection. The uplink allocation includes identification of the resources for use by the wireless terminal 30 for the connection. The uplink and downlink allocation are scheduling messages that only indicate which physical layer resources that should be used for transmission/reception. Upon receipt of the information of act 7-21, handover controller 86 of wireless terminal 30 sends a handover confirm message to the target eNodeB as depicted by act 7-22.

Act 7-23 reflects the fact that, during the foregoing, the MME/UPE may send further packet data to the source eNodeB, e.g., in-transit packets. But at some point the target eNodeB eventually sends a handover completed message to the source eNodeB, as illustrated by act 7-24. The handover completed message of act 7-24 is sent by the target eNodeB after the target eNodeB receives (from wireless terminal 30) the handover confirm message of act 7-22. Upon receiving the handover completed message to of act 7-24, as act 7-25 the handover controller 44 of eNodeB flushes the downlink SDU buffer 50, and continues delivering in-transit packets to the target eNodeB as illustrated by act 7-26.

Also after receiving the handover confirm message of act 7-22, the target eNodeB sends a UE update message to the MME/UPE, as shown by act 7-27. The UE update message of act 7-27 authorizes the MME/UPE to perform a switch (e.g., path switch depicted by act 7-28) so that the SDU packets for the connection are now routed to the target eNodeB rather than to the source eNodeB. Consequently, after the path switch act 7-28, SDUs are transmitted from MME/UPE to the target eNodeB, as reflected by act 7-29. Act 7-30 reflects the target eNodeB forming PDUs from the SDUs of the connection and transmitting the PDUs of the connection to the wireless terminal 30.

Figure 8A:
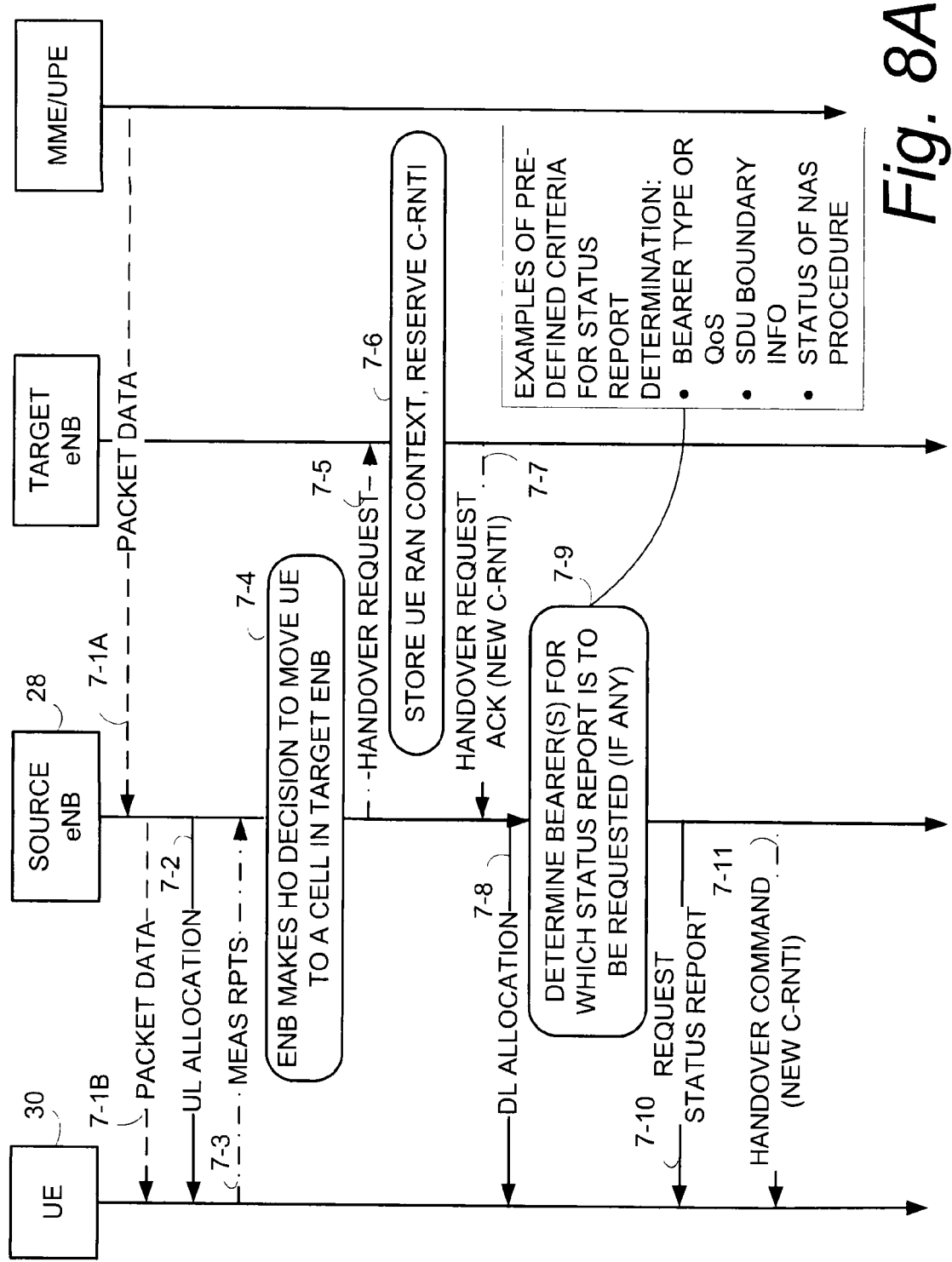
Figure 8C:
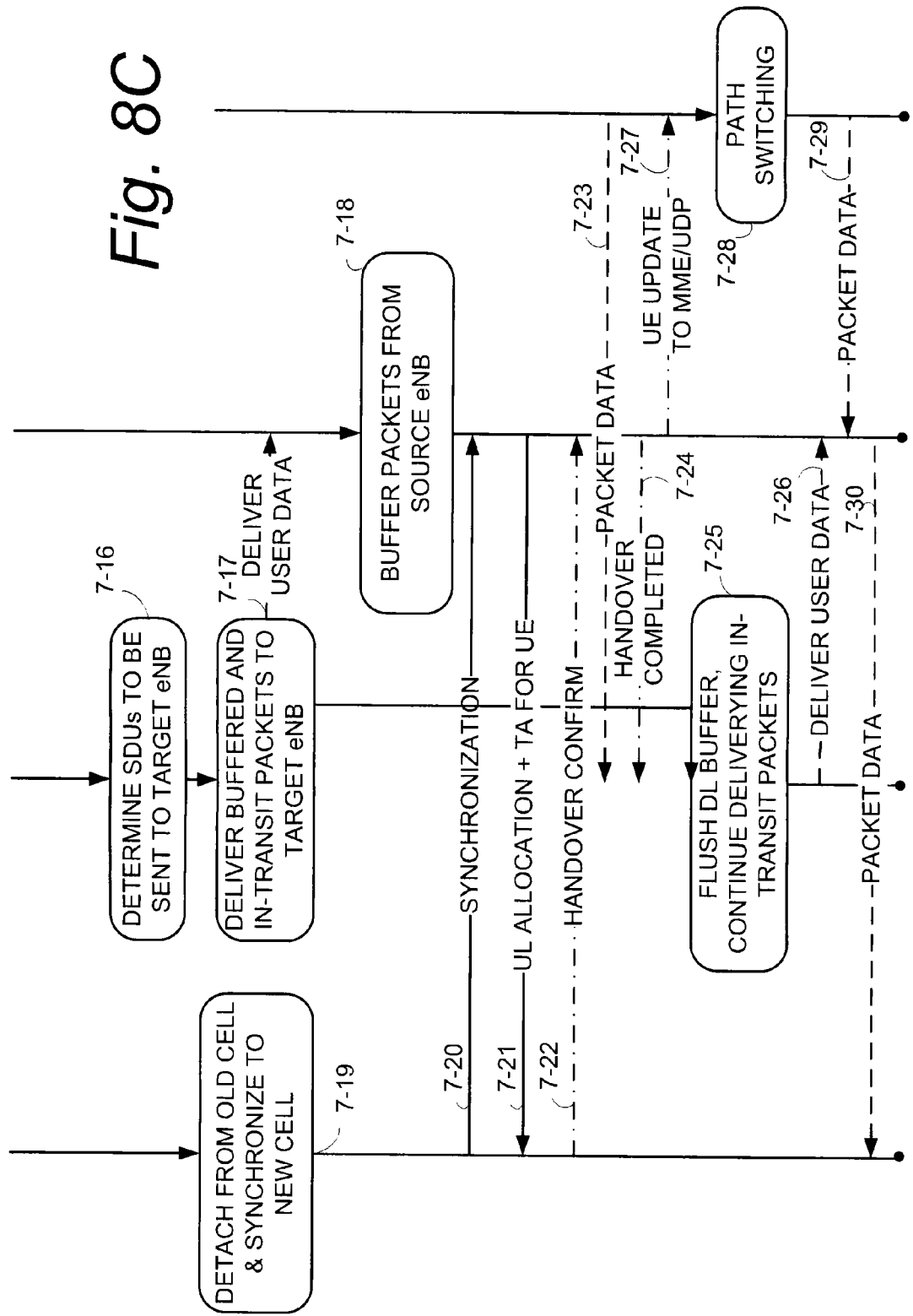

FIG. 8A-FIG. 8C illustrate another embodiment and mode of operation wherein there is also a request for the wireless terminal 30 to wait for a status report from the radio base station and to send a HARQ ACK for such status report before executing the handover. In essence, the acts of FIG. 8A-FIG. 8C are essentially the same as those of FIG. 7A-FIG. 7C, but further include act 8-1 through act 8-4. Act 8-1 shows the handover controller 86 determining or assessing whether it is required to wait for a status report from the radio base station before executing handover. If the determination of act 8-1 is negative, act 8-2 through act 8-4 can be omitted. However, if the determination of act 8-1 is affirmative, the handover controller 86 does indeed await the arrival of a status report from the radio base station. Act 8-2 depicts transmission of a status report from the radio base station. Act 8-3 depicts handover controller 86 making a determination whether the status report from the radio base station has been received. If not, the handover controller continues to await arrival until either the status report has been received or a predetermined timeout (the timeout aborts the handover and/or results in an error condition). Upon receipt of the status report as determined by act 8-3, the handover controller 86 commissions signal handler 72 to send an acknowledgement of the status report to the source eNodeB.

Thus, as explained above, the basic concept of sending a status reports prior to the handover execution, can be extended to requiring waiting for a status report(s) from the radio base station (e.g., eNodeB) as well prior to the handover execution. That is, in the case of FIG. 8A-FIG. 8C the eNodeB can indicate to the wireless terminal in the Handover Command (or by some other means) to wait for a status report from the eNodeB before starting to execute the handover. The eNodeB can rely on similar considerations as in the uplink case to determine when it requests the wireless terminal to wait for a status report from the eNodeB (e.g. based on the QoS attribute of the bearer or in order to finish a complete SDU and/or a NAS procedure).

Although the description above contains many specificities, these should not be construed as limiting the scope but as merely providing illustrations of some of the presently preferred embodiments. Therefore, it will be appreciated that the scope of the present invention fully encompasses other embodiments which may become obvious to those skilled in the art. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein and are intended to be encompassed hereby. Moreover, it is not necessary for a device or method to address each and every problem sought to be solved by the present invention, for it to be encompassed hereby.

The invention claimed is:

1. A method in a first radio base station of a mobile telecommunication network, said method for performing a handover of a wireless terminal to a second radio base station including sending a handover command to the wireless terminal, the method comprising:
identifying whether one or more radio bearers with outstanding data to be transmitted satisfy one or more pre-defined criteria, such that a packet data reception status report for the identified one or more radio bearers is to be requested from the wireless terminal; and
requesting the packet data reception status report for the identified one or more radio bearers from the wireless terminal, wherein the packet data reception status report includes information about data packet reception for the identified one or more radio bearers.

2. The method according to claim 1, further comprising indicating to the wireless terminal to wait for another status report from the first radio base station before executing the handover.

3. The method according to claim 1, wherein a pre-defined criterion comprises tolerance for packet losses or quality of service class for said identified one or more radio bearers.

4. The method according to claim 1, wherein a pre-defined criterion depends upon whether a higher layer transmission should be successfully completed by awaiting said outstanding data.

5. The method according to claim 1, wherein a pre-defined criterion is status of a potentially ongoing Non-Access Stratum (NAS) procedure.

6. The method according to claim 1, wherein the requesting is performed by a polling mechanism per bearer.

7. The method according to claim 1, wherein the requesting is performed by a single poll indicating plural bearers.

8. The method according to claim 1, wherein the requesting is performed by a poll request included in the handover command.

9. A radio base station in a mobile telecommunication network comprising means for performing a handover of a wireless terminal to a second radio base station, wherein said means including further means for performing the method according to claim 1.

10. A radio base station comprising:
a transceiver configured to facilitate wireless transmission between the radio base station and a wireless terminal over an air interface, including transmission of a radio link bearer for the connection over a downlink from the radio base station to the wireless terminal;
a status report requester configured to determine, according to one or more pre-defined criteria, whether to request from the wireless terminal a packet data reception status report for a radio bearer prior to the radio base station transferring user data for the connection to another radio base station in conjunction with a handover, wherein the packet data reception status report includes information about data packet reception for the identified one or more radio bearers.

11. The radio base station according to claim 10, further comprising a handover controller configured to generate an indication to the wireless terminal to wait for another status report from the radio base station before executing the handover.

12. The radio base station according to claim 10, wherein a pre-defined criterion comprises tolerance for packet losses or quality of service class for the bearer.

13. The radio base station according to claim 10, wherein a pre-defined criterion depends upon whether a higher layer transmission should be successfully completed by awaiting outstanding data to be transmitted over the downlink.

14. The radio base station according to claim 10, wherein a pre-defined criterion is status of a potentially ongoing Non-Access Stratum (NAS) procedure.

15. The radio base station according to claim 10, wherein the requesting is performed by a polling mechanism per bearer.

16. The radio base station according to claim 10, wherein the requesting is performed by a single poll indicating plural bearers.

17. The radio base station according to claim 10, wherein the requesting is performed by a poll request included in the handover command.

18. A method in a wireless terminal of a mobile telecommunication network when performing a handover from a first radio base station to a second radio base station, the method comprising:
receiving a handover command from the first radio base station;
determining whether to send a packet data reception status report for one or more radio bearers, wherein the packet data reception status report includes information about data packet reception for the identified one or more radio bearers;
if the packet data reception status report has not been requested, executing the handover;
if the packet data reception status report has been requested for one or more radio bearers sending said packet data reception status report; and then executing the handover.

19. The method of claim 18, further comprising determining whether to wait for another status report from the first radio base station before executing the handover.

20. The method of claim 18, further comprising waiting until a positive acknowledgement has been received for the packet data reception status report before executing the handover.

21. A wireless terminal in a mobile telecommunication network comprising means for performing a handover from a first radio base station to a second radio base station, wherein said means further includes means for performing the method according to claim 18.

22. A wireless terminal comprising:
a transceiver configured to facilitate wireless transmission between the wireless terminal and one or more radio base stations over an air interface, including transmission of a radio link bearer for the connection over a downlink from a source radio base station to the wireless terminal; and
a handover controller configured to ascertain whether, pursuant to a request from the source radio base station, a packet data reception status report is to be sent to the source radio base station for a radio bearer involved in a connection with the source radio base station prior to performing a handover of the connection from the source radio base station to a target radio base station wherein the packet data reception status report includes information about data packet reception for the identified one or more radio bearers.

23. The wireless terminal of claim 22, further comprising:
a status report generator configured to generate the packet data reception status report.

* * * * *